United States Patent
Azuma (10) Patent No.: US 8,860,679 B2
(45) Date of Patent: Oct. 14, 2014

(54) POINTING TO A DESIRED OBJECT DISPLAYED ON A TOUCHSCREEN

(71) Applicant: International Business Machines Corporation, Armonk, NY (US)

(72) Inventor: Yukio Azuma, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 13/648,362

(22) Filed: Oct. 10, 2012

(65) Prior Publication Data
US 2013/0088454 A1 Apr. 11, 2013

(30) Foreign Application Priority Data
Oct. 11, 2011 (JP) ................................ 2011-223811

(51) Int. Cl.
*G06F 3/041* (2006.01)

(52) U.S. Cl.
CPC .................................. *G06F 3/0416* (2013.01); *G06F 2203/04101* (2013.01)
USPC ...................... 345/173; 178/18.01; 178/18.05; 178/18.06; 715/857; 715/858; 715/862; 345/174

(58) Field of Classification Search
USPC ......... 345/157, 169, 173–175, 179, 419, 650, 345/661, 676; 178/18.01, 18.05, 18.06, 178/18.09; 700/17, 83, 251; 715/700, 711, 715/835, 856–858, 862–864
See application file for complete search history.

(56) References Cited

U.S. PATENT DOCUMENTS

| 5,327,528 | A | * | 7/1994 | Hidaka et al. | 715/858 |
| 5,764,222 | A | * | 6/1998 | Shieh | 345/173 |
| 5,870,083 | A | * | 2/1999 | Shieh | 345/173 |
| 2006/0244735 | A1 | * | 11/2006 | Wilson | 345/173 |
| 2007/0211022 | A1 | * | 9/2007 | Boillot | 345/156 |
| 2008/0273755 | A1 | * | 11/2008 | Hildreth | 382/103 |
| 2011/0004821 | A1 | * | 1/2011 | Miyazawa et al. | 715/702 |
| 2011/0083089 | A1 | * | 4/2011 | Pahud et al. | 715/765 |
| 2011/0205185 | A1 | * | 8/2011 | Newton et al. | 345/175 |

(Continued)

FOREIGN PATENT DOCUMENTS

JP 06051908 A 2/1994
JP 08190456 A 7/1996

(Continued)

OTHER PUBLICATIONS

International Preliminary Report on Patentability for International Application No. PCT/JP2012/069632 dated Apr. 15, 2014, pp. 1-6.

*Primary Examiner* — Lun-Yi Lao
*Assistant Examiner* — Elliott Deaderick
(74) *Attorney, Agent, or Firm* — Winstead, P.C.

(57) ABSTRACT

A method, system and computer program product for pointing to an object displayed on a touchscreen, the touchscreen having a display function. The coordinates of a point P, the point P being a position of a fingertip of a user on a surface of the touchscreen, is calculated. A vertical distance R between the surface of the touchscreen and the fingertip is further calculated. Furthermore, the coordinates of a point Q of a line segment OQ is calculated, the line segment OQ extending in the same direction as a line segment OP connecting an origin O on the surface of the touchscreen and the point P, the line segment OQ having a length that is proportional to the vertical distance R. In response to an object being displayed at the coordinates of the point Q, determining that the object has been pointed to.

25 Claims, 9 Drawing Sheets

(56) References Cited

U.S. PATENT DOCUMENTS

2012/0036479 A1* 2/2012 Kasahara et al. .............. 715/825
2012/0229377 A1* 9/2012 Kim et al. ..................... 345/157

FOREIGN PATENT DOCUMENTS

| | | |
|---|---|---|
| JP | 2004054861 A | 2/2004 |
| JP | 2004078323 A | 3/2004 |
| JP | 2009245239 A | 10/2009 |
| JP | 2010102474 A | 5/2010 |
| JP | 2010122972 A | 6/2010 |
| JP | 2010211352 A | 9/2010 |
| WO | 2006041097 A1 | 4/2006 |
| WO | 2013054583 A1 | 4/2013 |

\* cited by examiner

POINTING TO A DESIRED OBJECT DISPLAYED ON A TOUCHSCREEN

CROSS-REFERENCE TO RELATED APPLICATIONS

This application claims priority under 35 U.S.C. §119(a) from Japanese Patent Application No. 2011223811, filed on Oct. 11, 2011, the contents of which are incorporated herein by reference.

TECHNICAL FIELD

The present invention relates generally to pointing to an object displayed on a display screen, and more particularly, to pointing to an object which is distant from object pointing means.

BACKGROUND

Various types of information processing apparatuses including a touchscreen have been developed in recent years. A touchscreen allows the user to operate information intuitively by directly touching the screen. A touchscreen also allows the user to select or operate an object using only one hand. However, when an object is hidden behind a finger or when an object to be touched is distant from a finger, the apparatus must be held differently, or the object must be selected using the other hand.

Methods attempting to address such a problem can only point to an object in the range reached by a finger. Another method to address such a problem includes disposing buttons in an area other than the display area and selecting a button representing a necessary function. However, this method requires that external buttons be disposed, and it is not easy to understand the relationship between an object to be pointed to and a button.

BRIEF SUMMARY

In one embodiment of the present invention, a method for pointing to an object displayed on a touchscreen using an information processing apparatus, the information processing apparatus being connected to the touchscreen so that the touchscreen and the information processing apparatus can communicate data to each other, the touchscreen having a display function, the method comprising calculating coordinates of a point P, the point P being a position of a fingertip of a user on a surface of the touchscreen. The method further comprises calculating a vertical distance R between the surface of the touchscreen and the fingertip. Furthermore, the method comprises calculating coordinates of a point Q of a line segment OQ, the line segment OQ extending in the same direction as a line segment OP connecting an origin O on the surface of the touchscreen and the point P, the line segment OQ having a length that is proportional to the vertical distance R. In addition, the method comprises determining, by a processor, that an object has been pointed to in response to the object being displayed at the coordinates of the point Q.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The principles of the present invention are directed to provide a method, apparatus, and computer program that allow the user to point to an object intuitively and select it eventually, without limiting the range where an object can be pointed to and without having to dispose external buttons or the like.

To solve the problems discussed in the Background section, the present invention provides a method for pointing to an object displayed on a touchscreen using an information processing apparatus, the information processing apparatus being connected to the touchscreen so that the touchscreen and the information processing apparatus can communicate data to each other, the touchscreen having a display function. The method includes the steps of: calculating coordinates of a point P, the point P being a position of a fingertip of a user on a surface of the touchscreen; calculating a vertical distance R between the surface of the touchscreen and the fingertip; calculating coordinates of a point Q of a line segment OQ, the line segment OQ extending in the same direction as a line segment OP connecting an origin O on the surface of the touchscreen and the point P, the line segment OQ having a length that is proportional to the vertical distance R; and in response to an object being displayed at the coordinates of the point Q, determining that the object has been pointed to.

The step of calculating coordinates of the point Q includes the step of calculating coordinates of a point Q of a line segment OQ having a length that is inversely proportional to the vertical distance R.

The step of calculating coordinates of the point Q includes the step of calculating coordinates of a point Q of a line segment OQ having a length that is proportional or inversely proportional to a square of the vertical distance R.

The step of determining includes the step of changing display attributes of the pointed object.

The step of calculating the coordinates of the point Q includes the step of displaying the line segment OQ on the touchscreen.

The step of calculating the coordinates of the point Q includes the step of displaying the point Q on the touchscreen.

The method further includes the step of, in response to the point Q having stayed in a display area of the object for a predetermined time, determining that the object has been selected.

The method further includes the step of, in response to the object having been selected, further changing display attributes of the object.

The method further includes the step of, in response to the object having been selected, performing a function that is previously assigned to the object.

The method further includes the step of, in response to the point Q having left the display area of the object before a predetermined time elapses, cancelling the pointing of the object and restoring the display attributes to the original.

Another aspect of the present invention provides a method for pointing to an object displayed on a touchscreen using an information processing apparatus, the information processing apparatus being connected to the touchscreen so that the touchscreen and the information processing apparatus can communicate data to each other, the touchscreen including a pointer having an end fixed by a freely moving contact and having a display function. The method includes the steps of: calculating coordinates of a point P, the point P being a position of a head of the pointer on a surface of the touchscreen, the head not being fixed; calculating a vertical distance R between the surface of the touchscreen and the head of the pointer; calculating coordinates of a point Q of a line segment OQ, the line segment OQ extending in the same direction as a line segment OP connecting an origin O on the surface of the touchscreen and the point P, the fixed end of the pointer being located at the origin O, the line segment OQ having a length that is proportional to the vertical distance R; and in response to an object being displayed at the coordinates of the point Q, determining that the object has been pointed to.

Yet another aspect of the present invention provides an apparatus for pointing to an object displayed on a touchscreen using an information processing apparatus, the information processing apparatus being connected to the touchscreen so that the touchscreen and the information processing apparatus can communicate data to each other, the touchscreen including a pointer having an end fixed by a freely moving contact and having a display unit. The apparatus includes: means that calculates coordinates of a point P, the point P being a position of a head of the pointer on a surface of the touchscreen, the head not being fixed; means that calculates a vertical distance R between the surface of the touchscreen and the head of the pointer; means that calculates coordinates of a point Q of a line segment OQ, the line segment OQ extending in the same direction as a line segment OP connecting an origin O on the surface of the touchscreen and the point P, the fixed end of the pointer being located at the origin O, the line segment OQ having a length that is proportional to the vertical distance R; and means that, in response to an object being displayed at the coordinates of the point Q, determines that the object has been pointed to.

The apparatus includes a socket disposed on one side of the touchscreen, the side including the fixed end, and configured to store the pointer.

The freely moving contact includes means that detects a press in a direction of an axis of the pointer and means that, in response to the press having been detected, determines that the pointed object has been selected.

The freely moving contact preferably includes a spring for supporting the center of the pointer.

Still another of the present invention provides a computer program for causing a computer to perform the steps of the methods.

Now, apparatuses for displaying, pointing to, and selecting an object according to embodiments of the present invention will be described in detail with reference to the accompanying drawings. As a matter of course, the embodiments do not limit the invention set forth in the claims, and all combinations of the features described in the embodiments are not essential as problem solving means.

The present invention can be carried out in many different aspects and is not to be construed as being limited to the description of the embodiments.

In the following embodiments, apparatuses having computer programs installed in a computer system will be described. As is apparent for those skilled in the art, the present invention can also be carried out as a computer-executable computer program. That is, the present invention can be carried out as a hardware embodiment, specifically, as an apparatus for pointing to and selecting an object displayed on a display device that is connected to the apparatus in such a manner that the apparatus and the display device can communicate data to each other; as a software embodiment; and as a hardware-software combination embodiment.

The computer program can be stored in any computer-readable storage medium, such as a hard disk, a digital versatile disc (DVD), a compact disc (CD), an optical storage device, or a magnetic storage device.

According to the embodiments of the present invention, it is possible to easily point to the desired object which is remotely displayed, without having to dispose mechanical switches or buttons.

Figure 1:
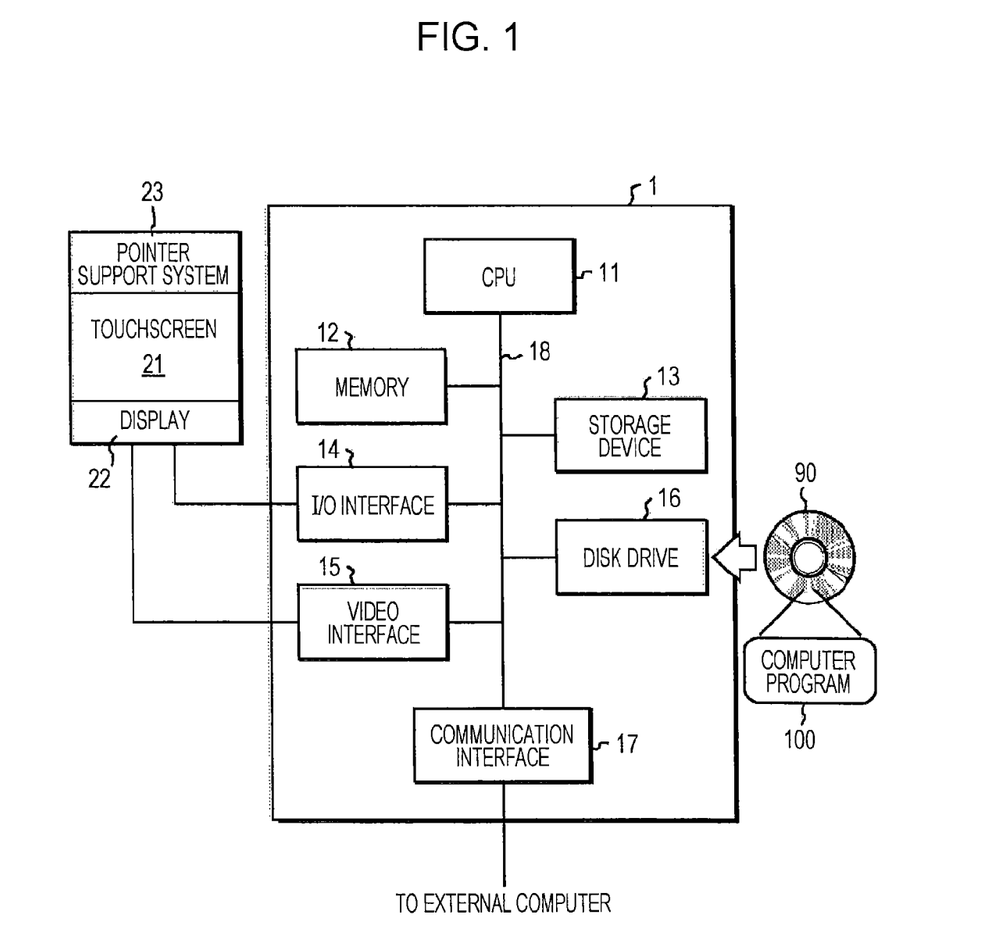
FIG. 1 is a block diagram showing a configuration of an information processing apparatus according to an embodiment of the present invention.

Referring now to the Figures in detail, FIG. 1 is a block diagram showing a configuration of an information processing apparatus according to a first embodiment of the present invention. An information processing apparatus 1 according to the first embodiment includes at least a central processing unit (CPU) 11, a memory 12, a storage device 13, an I/O interface 14, a video interface 15, a disk drive 16, a communication interface 17, and an internal bus 18 connecting the above-mentioned hardware components together.

The CPU 11 is connected to the above-mentioned hardware components of the information processing apparatus 1 via the internal bus 18. It controls operations of the hardware components as well as performs various hardware functions in accordance with a computer program 100 stored in the storage device 13. The memory 12 is loaded with a load module in the execution of the computer program 100. It also stores temporary data or the like generated during execution of the computer program 100.

The storage device 13 is a built-in, fixed storage device, such as ROM. The computer program 100 stored in a transportable storage medium 90, such as a DVD or CD-ROM, is downloaded into the storage device 13 via a transportable disk drive 16. In the execution of the computer program 100, it is loaded from the storage device 13 into the memory 12 and then executed. Of course, the computer program 100 may be downloaded from an external computer which is connected to the information processing apparatus 1 via the communication interface 17.

The communication interface 17 is connected to the internal bus 18. When it is connected to an external network, such as the Internet, a local area network (LAN), or a wide area network (WAN), the communication interface 17 can transmit data to an external computer or the like or receive data therefrom.

The I/O interface 14 is connected to a touchscreen 21 and receives data therefrom. The video interface 15 is connected to a display 22 that is integrated with the touchscreen 21 and displays an image of an object. While it is preferred to integrate the touchscreen 21 and the display 22 in selecting an object normally, the integration is not essential. It should be noted that an object pointing system unique to the present invention functions without problems even when the touchscreen 21 and the display 22 are separated. The user points to or selects an object displayed on the display 22 using a method or configuration unique to the present invention.

A pointer support system 23 is an auxiliary system for pointing to an object by operating a pointer using a finger rather than pointing to an object using a finger. This is not an essential component. The pointer support system 23 includes a pointer, a freely moving contact, and a joint for outputting electrical signals. It transmits an electrical signal representing the inclination of the pointer in three-dimensional space to the I/O interface 14.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Figure 2:
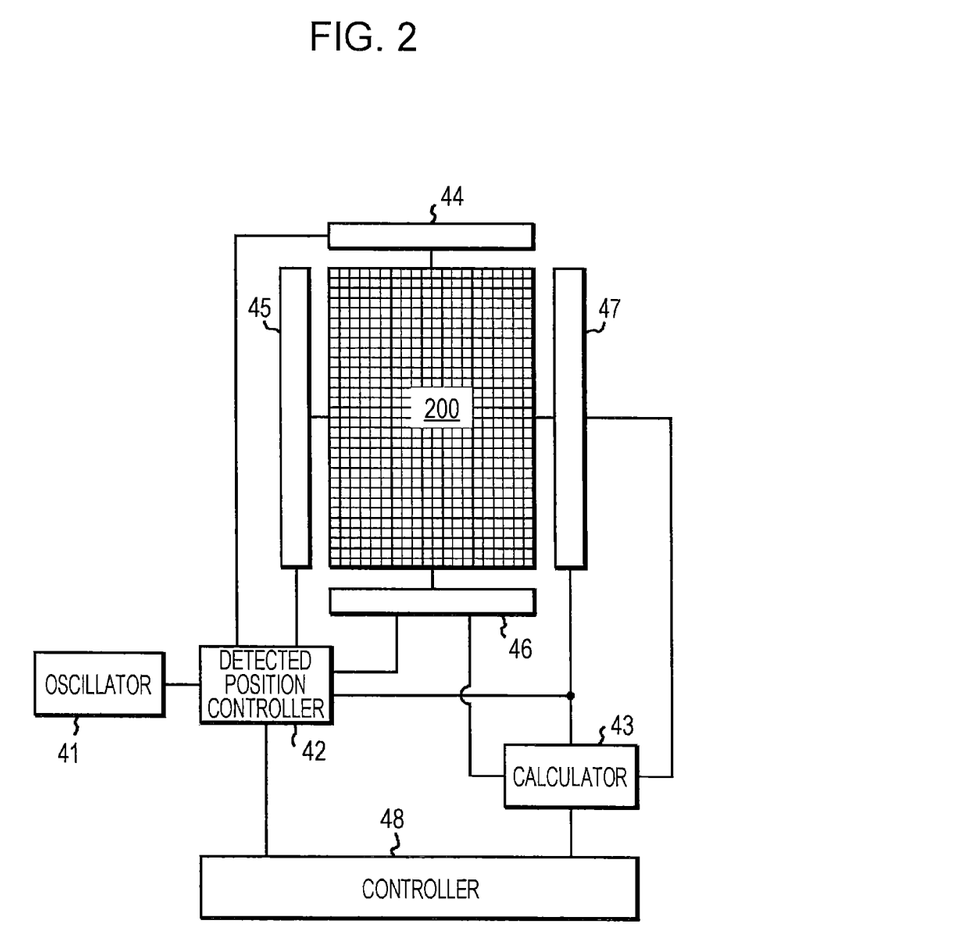
FIG. 2 shows an example configuration of a typical touchscreen in accordance with an embodiment of the present invention.

FIG. 2 is a block diagram showing a configuration of the touchscreen 21 according to the first embodiment. As shown in FIG. 2, the touchscreen 21 according to the first embodiment includes at least a touchscreen unit (display) 200, an oscillator 41, a detected position controller 42, a calculator 43, an x-axis input side switch 44, a y-axis input side switch 45, an x-axis output side switch 46, a y-axis output side switch 47, and a controller 48.

FIG. 2 shows a configuration of a typical touchscreen, and various types of touchscreens are known. Known methods for detecting a position in a touchscreen include matrix switch type, as well as resistive layer type, surface acoustic wave type, infrared type, electromagnetic induction type, capacitive type, and combinations thereof. In the capacitive type, the distance is measured using the capacitance between the touchscreen and a finger or a pointer. In addition, multipoint contact detection is possible.

The touchscreen unit 200 is a touchscreen where x-axis electrode lines for detecting a position in the x-axis direction and y-axis electrode lines for detecting a position in the y-axis direction are arranged in a matrix. The oscillator 41 generates pulse signals. The detected position controller 42 selects an electrode line to be connected from among the x-axis electrode lines and the y-axis electrode lines of the touchscreen unit 200.

The calculator 43 detects a signal from the touchscreen unit 200 and calculates a position touched by a finger or a position adjacent to the position. The x-axis input side switch 44 is configured to input pulse signals to the input ends of the x-axis electrode lines. The y-axis input side switch 45 is configured to input pulse signals to the input ends of the y-axis electrode lines. The x-axis output side switch 46 is configured to connect the output ends of the x-axis electrode lines to the calculator 43. The y-axis output side switch 47 is configured to connect the output ends of the y-axis electrode lines to the calculator 43.

The controller 48 controls the entire operation of the touchscreen 21 as well as instructs the detected position controller 42 to detect a position touched by a finger or a position adjacent to the position in a state in which a predetermined number of electrodes are connected. When the position is detected, the controller 48 instructs the detected position controller 42 to connect electrodes adjacent to the detected position separately and connect a predetermined number of other electrodes.

The calculator 43 obtains, for example, information indicating that the finger is in contact with, adjacent to, or distant from the touchscreen, in the form of an output signal from the touchscreen 21. At this time, it can also estimate the distance between the finger and the touchscreen 21 on the basis of a variation in static voltage. It can also estimate the inclination angle of a movement of the finger.

Figure 3:
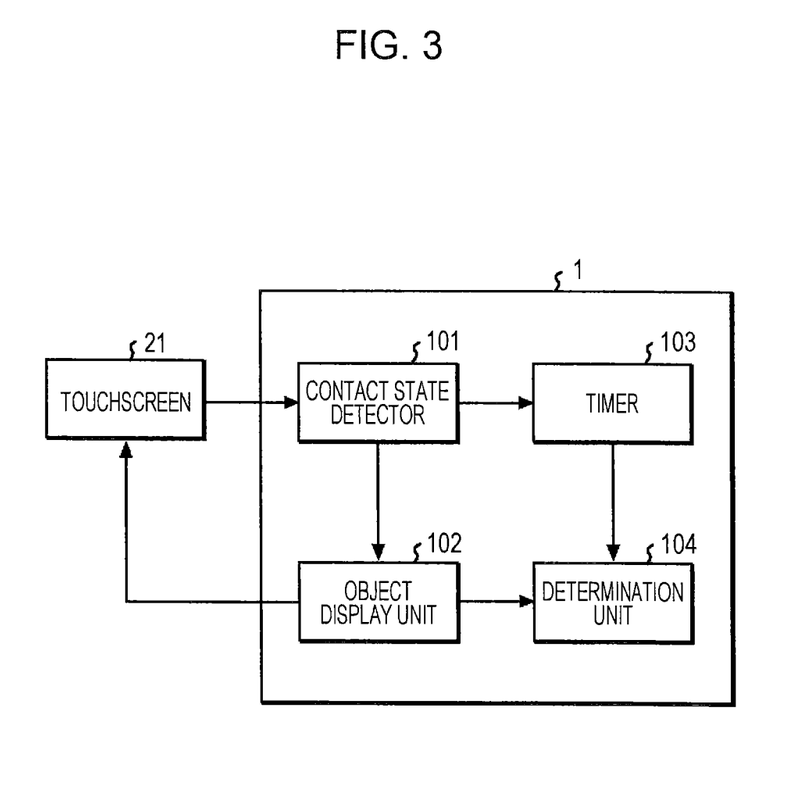
FIG. 3 is a function block diagram of the information processing apparatus according to an embodiment of the present invention.

An operation of the apparatus for pointing to or selecting an object will be described. FIG. 3 is a function block diagram of the information processing apparatus 1 according to the first embodiment.

In FIG. 3, a contact state detector 101 of the information processing apparatus 1 receives signals outputted by the touchscreen 21 and extracts, from the signals, information on the vertical distance between the tip of a finger (or pointer head) and the touchscreen 21 and information on the contact state of the finger. Information on the contact state of the finger refers to, for example, information indicating that the finger is in contact with, adjacent to, or remote from the touchscreen 21. This information can be obtained from signals outputted by sensors of the touchscreen 21. If the finger is adjacent to the touchscreen 21, the distance therebetween is calculated using the capacitance between the finger and the touchscreen 21, or the like.

An object display unit 102 changes the object display method on the basis of the information on the contact state of the finger. For example, if there is an object that can be pointed to in accordance with the distance between the finger tip of the user and the touchscreen 21 as well as the direction of the finger on the touchscreen surface, display attributes of the object are changed. Display attributes refer to color, shape, flashing, brightness, and the like.

A timer 103 measures the time elapsed since detecting that one object is pointed to by the finger or object pointing means (pointer). A determination unit 104 determines whether a predetermined time has elapsed since the timer 103 starts measuring the time. When the determination unit 104 determines that the predetermined time has elapsed since the timer 103 starts measuring the time, the object display unit 102 places the object in a selection state, changes display attributes thereof, and displays the resulting object. The predetermined time is, for example, about 500 ms.

While the pointed object is selected based on whether the predetermined time has elapsed, it may be selected in other ways. For example, a selection button disposed on the touchscreen 21 or an external switch disposed as software or hardware may be turned on. Further, information on the vibration of the apparatus obtained from an acceleration sensor or the like may be used as a trigger for a selection operation. Various types of trigger signals for selecting an object are conceivable.

Figure 4:
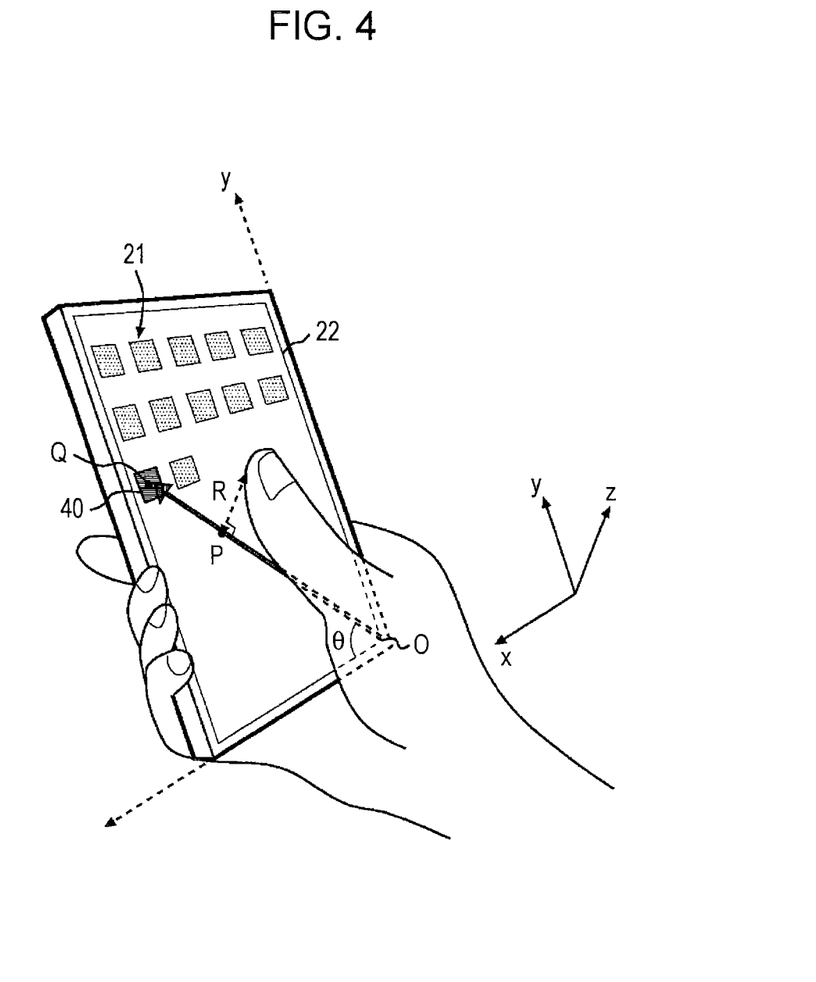
FIG. 4 is a bird's eye view showing an example operation of the information processing apparatus according to an embodiment of the present invention.

FIG. 4 shows a bird's eye view showing the information processing apparatus 1 according to the first embodiment and a thumb. As is understood from FIG. 4, when the thumb is placed on the touchscreen 21, the coordinates of an intersection point P and a vertical distance R between the thumb and the touchscreen 21 are obtained. The intersection point P refers to an intersection point of a normal extending from the tip of the thumb to the touchscreen surface and the touchscreen 21. An object 40 present in the direction of a line segment OP connecting an origin O of the touchscreen surface and the point P is to be pointed to. A line segment OQ obtained by extending the line segment OP in the same direction as the line segment OP is considered. The coordinates of an endpoint Q of the line segment OQ are calculated using the vertical distance R. The coordinates are calculated using, for example, a formula for calculating the coordinates in such a manner that the length of the line segment OQ is proportional to R, inversely proportional to R, or inversely proportional to the square of R.

For example, if the length of the line segment OQ is proportional to R, a more distant object can be pointed to as R becomes larger. In contrast, if the length of the line segment OQ is inversely proportional to R, a more distant object can be pointed to as R becomes smaller. If the touchscreen 21 is wide, the coordinates of the point Q are calculated in such a manner that the length of the line segment OQ is proportional or inversely proportional to the square of R. The degree of this proportionality can be changed in various ways in accordance with the operating environment.

In the first embodiment, the line segment OQ that is proportional to R is considered. The coordinates of the point Q are calculated using the following formula:

$$Q(Qx,Qy)=P(a \cdot R \cdot Px, a \cdot R \cdot Py)$$

where (Qx, Qy) represents the coordinates of the point Q; (Px, Py) represents the coordinates of the point P; R represents the vertical distance; and a represents a constant.

Preferably, the line segment OQ or the point P is graphically displayed. Thus, the user can visually recognize the current position of the pointer. If an object 40 is displayed at the coordinates of Q thus calculated, the object 40 is determined to have been pointed to, and the display attributes thereof are changed.

Figure 9:
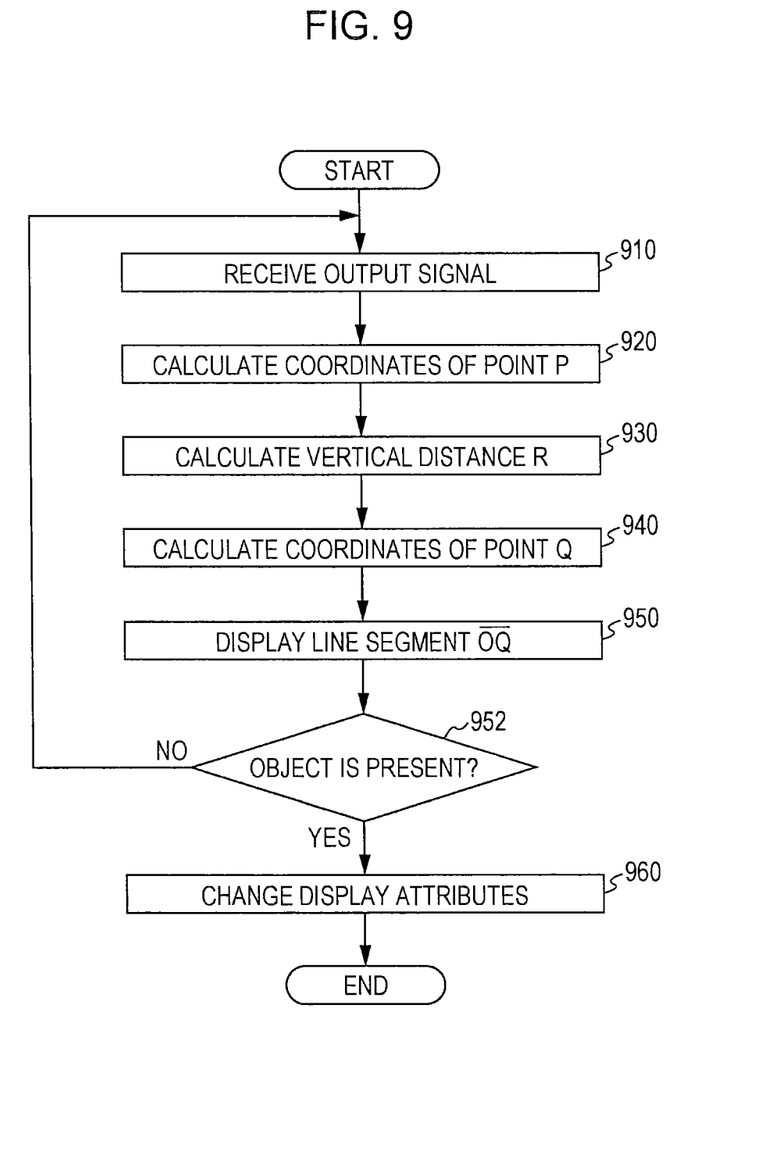
FIG. 9 is a flowchart of an alternative method for pointing to an object displayed on a touchscreen in accordance with an embodiment of the present invention.

FIG. 9 is a flowchart showing an object pointing process according to an embodiment of the present invention. Referring to FIG. 9, in conjunction with FIGS. 1-4, in step 910, a signal outputted by the touchscreen 21 is received. In step 920, the coordinates of the point P, which is the position of a thumb tip on the touchscreen 21, are calculated. In step 930, the vertical distance R between the thumb tip and the touchscreen 21 is calculated.

In step 940, the coordinates of the point Q of the line segment OQ extending in the same direction as the line segment OP are calculated on the basis of the vertical distance R (e.g., in such a manner that the length of the line segment OQ is proportional to R, proportional to the square of R, or inversely proportional to R). In step 950, it is preferred to present the current position of the pointer to the user by displaying the line segment OQ or the point Q.

In step 952, whether an object is displayed at the coordinates of the point Q is determined. If the determination in step 952 is NO, the process returns to step 910. If the determination in step 952 is YES, then, in step 960, display attributes of the object 40 are changed, and the user is notified that the object 40 is pointed to.

The first embodiment has been described in terms of vector. Hereafter, this embodiment will be described in terms of an angle formed with the touchscreen surface. Returning now to FIG. 4, when the intersection point P is calculated in FIG. 4, an angle θ formed by the line segment OP connecting the origin O and the intersection point P with the x axis is determined. Here, the line segment OQ that forms the angel θ with the x axis and whose length is proportional or inversely proportional to R is considered. By adjusting the distance R, the point Q comes into contact with the object 40. Thus, the object 40 can be pointed to. That is, any object 40 can be pointed to by using the origin O and polar coordinates of the pointer, the thumb.

It is preferred to display on the display 22 the line segment OQ that expands or contracts in accordance with a vertical movement of the thumb. Thus, the user can easily point to any object 40 while checking how the line segment OQ expands or contracts in accordance with a movement of the thumb.

The timer 103 starts measuring the time since the point in time when a tip Q of the line segment OQ reaches the object 40 in FIG. 4. In response to the tip Q having stayed for a time period exceeding predetermined time, the object 40 is determined to have been selected. Preferably, display attributes of the object 40 are changed at the point in time when the tip Q reaches the object 40. When the tip Q leaves the object 40, the display attributes of the object 40 are restored to the original.

Figure 5:
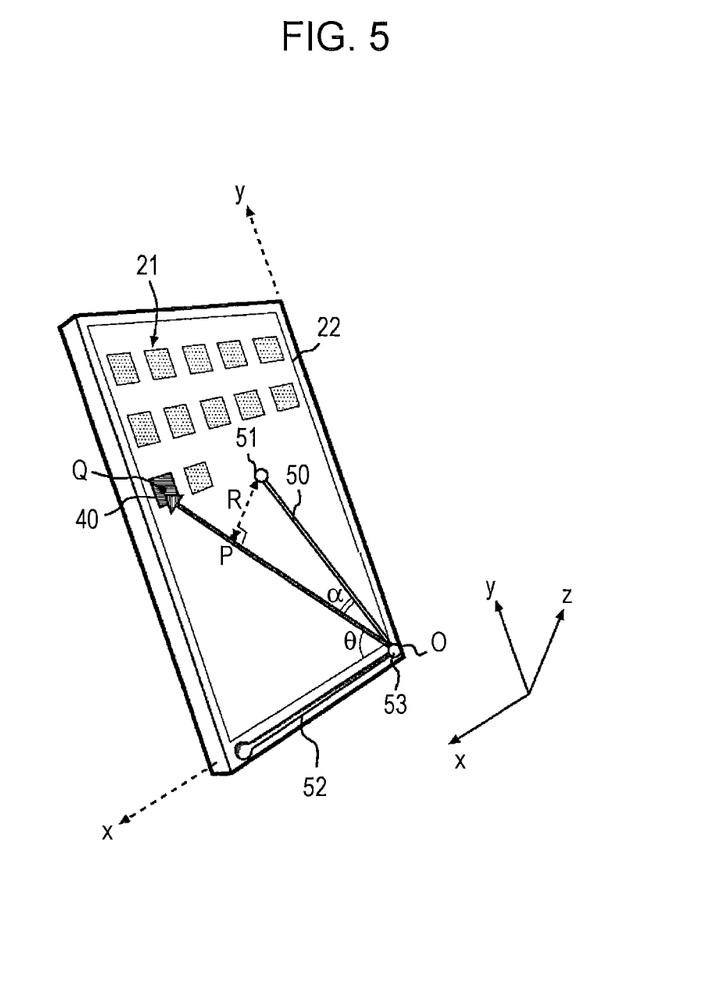
FIG. 5 is a bird's eye view of the information processing apparatus and a pointer according to a second embodiment of the present invention.

FIG. 5 a bird's eye view of an information processing apparatus 1 and a pointer according to a second embodiment of the present invention. In FIG. 5, the thumb in FIG. 4 is replaced with a pointer 50. One end 53 of the pointer 50 is fixed to an origin O. The end 53 is fixed using a freely moving contact. An object 40 is pointed to by moving a head 51 using a finger.

The head 51 of the pointer 50 is preferably a small sphere. The head 51 is preferably made of a material having a capacitance larger than a finger. The pointer 50 can preferably be stored in a socket 52 disposed on a side wall of the display 22, when not in use. Preferably, a grooved socket (mortise) that can exactly store the pointer 50 is disposed on one side of the touchscreen 21.

When the pointer 50 is detached from the socket 52, it is restored to the center position by a spring. The center position is in the z-axis direction or forms 45 degrees (θ=α=45 degrees) with respect to an xy plane. By securing such a center position, the user can move the head 51 using one finger without having to grasp it using multiple fingers. Further, when the head 51 is released from the finger, it returns to the original position. As seen, the pointer 50 has good usability.

As is understood from FIG. 5, an intersection point P of a normal extending from the head 51 of the pointer 50 to the touchscreen surface with the touchscreen 21 as well as a vertical distance R are calculated. When the intersection point P is calculated, an angle θ formed by a line segment OP connecting the origin O and the intersection point P with the x axis is determined. An object 40 displayed on any position of a display 22 can be pointed to by expanding θ and a line segment OQ in such a manner that they are proportional to R. That is, any object 40 can be pointed to by using the origin O and polar coordinates of the head 51.

It is preferred to display on the display 22 the line segment OQ that has expanded or contracted in accordance with a vertical movement of the head 51. Thus, the user can know how the line segment OQ expands or contracts in accordance with the position of the head 51. As a result, the user can point to any object with ease.

The timer 103 (FIG. 3) starts measuring the time since the point in time when a tip Q of the line segment OQ reaches the object 40 in FIG. 5. In response to the tip Q having stayed for time exceeding predetermined time, the object 40 is determined to have been selected. Preferably, display attributes of the object 40 are changed at the point in time when the tip Q reaches the object 40. When the tip Q leaves the object 40, the display attributes of the object 40 are restored to the original.

Figure 6:
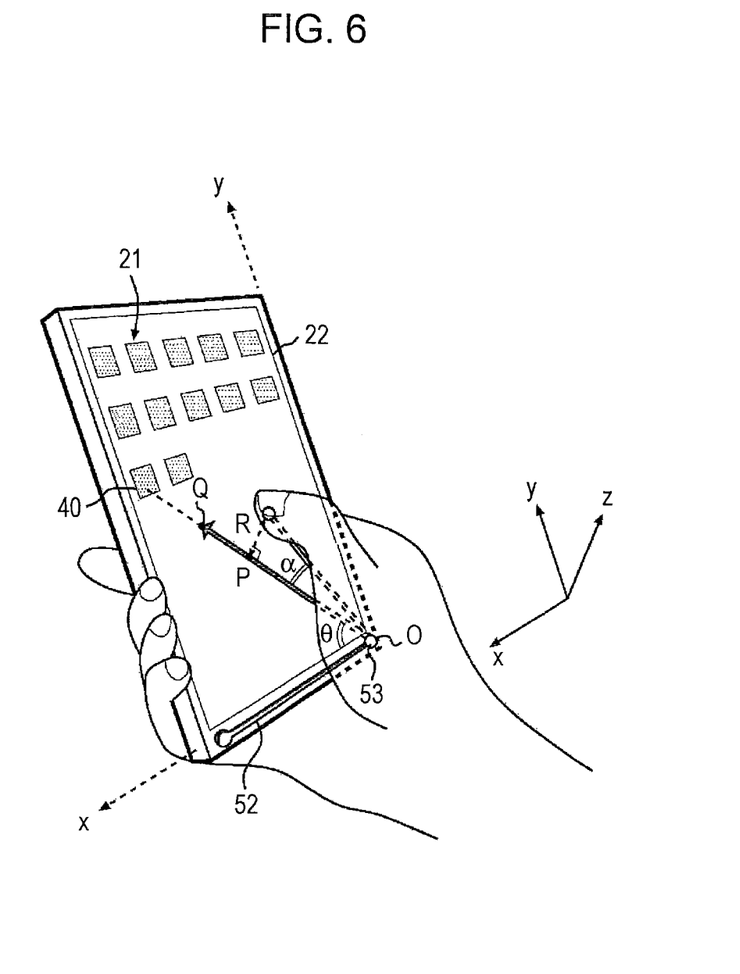
FIG. 6 is a bird's eye view showing an operation of the pointer using a finger in accordance with the second embodiment of the present invention.

FIG. 6 is a bird's eye view showing an operation of the pointer 50 using a finger in accordance with an embodiment of the present invention. Referring to FIG. 6, in conjunction with FIG. 5, the user moves the pointer head 51 using a finger and expands or contracts the line segment OQ displayed on the display 22 so that it reaches the object 40.

Since the vertical distance R is small in FIG. 6, the line segment OQ does not reach the object 40. If the user relaxes the thumb, the pointer is returned to the z-axis direction (center position) by force of a spring. Thus, the vertical distance R is increased. The increase in the vertical distance R extends the line segment OQ, causing the point Q to approach the object 40.

When the point Q comes into contact with the object 40, the object is determined to have been pointed to, and display attributes thereof are changed. Further, in response to the point Q having stayed in the display area of the object for given time, the object 40 is determined to have been selected. Subsequently, a function that is previously assigned to the object 40 is performed. Preferably, display attributes of the object 40 are further changed at the point in time when the object is selected and to notify the user that the function of the selected object will be performed.

Alternatively, by pressing the head 51 of the pointer 50 in the direction toward the origin O, which is the direction of the pointer axis, at the point in time when the line segment OQ reaches the area of the object 40, the object 40 is determined to have been selected.

Figure 7:
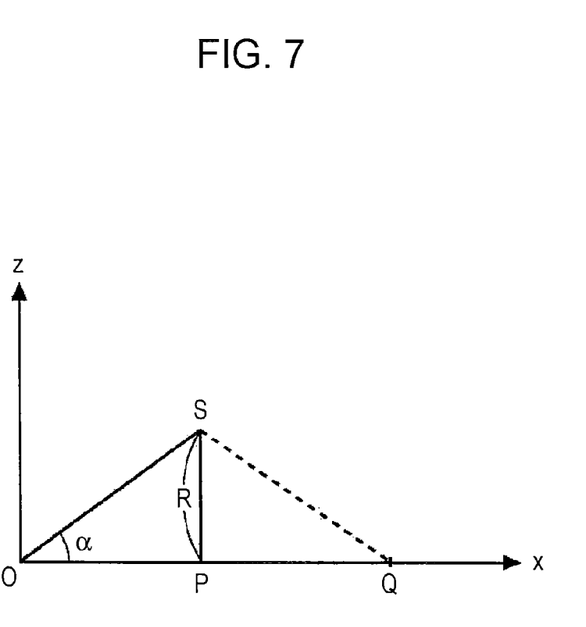
FIG. 7 is a diagram showing calculation of a line segment OQ in accordance with an embodiment of the present invention.

FIG. 7 is an auxiliary diagram showing the expansion or contraction of the line segment OQ in accordance with an embodiment of the present invention. Referring to FIG. 7, in conjunction with FIGS. 5-6, a point S corresponds to the position of the head 51. The line segment OQ is proportional to R, which is the length of a line segment SP. This is represented by the following formula:

Line segment $OQ = c \cdot R$ where c represents a constant of c>0.

If the touchscreen 21 has a wide area, the line segment OQ may be proportional to the square of R so that a remote object can be pointed to, as in the following formula.

Line segment $OQ = c \cdot R \cdot R$

If it is desired to point to a more adjacent object as R becomes longer and point to a more distant object as R becomes shorter, R in the above formula needs to be replaced with the reciprocal, 1/R.

The line segment OQ may be calculated in a different way using the following formula:

Line segment $OQ = c \cdot$ line segment $OS \cdot \sin(\alpha)$ where $\alpha$ represents an angle formed by the line segment OP and the line segment OS. The line segment OS represents the length of the pointer 50 (FIG. 5). The value of c is set to, e.g., about 1 to about 2 if the area of the touchscreen 21 is similar to the value obtained by squaring the length of the pointer 50; it is set to, e.g., 2 or more if the area of the touchscreen 21 is twice. This is only a guideline. A value that provides good usability is explored by combining the touchscreen 21 and the pointer 50.

If a freely moving contact is used at the point which the end 53 of the pointer 50 is in contact with the touchscreen 21, an angle formed by the line segment OQ and the line segment OS is easily obtained. Freely moving contacts are widely used in keypads for game, joysticks, and the like, and the structure thereof is known. Use of a freely moving contact allows the three-dimensional inclination of the pointer to be obtained in the form of an electrical signal. Use of a freely moving contact also allows $\theta$ to be obtained. As in a keypad, joystick, or the like, a freely moving contact includes a spring for supporting the center of the pointer 50.

Among freely moving contacts is also one including a switch that can be pressed in the direction of the pointer axis. Pressing the pointer 50 in the direction of the pointer axis (the direction toward the origin O) using this switch can be regarded as selection of an object 40. According to this embodiment, it is possible to point to or select an object 40 using only the pointer 50 and the freely moving contact of the end 53.

By pressing the head 51 of the pointer 50 in the direction toward the origin O, which is the direction of the pointer axis, at the point in time when the line segment OQ reaches the area of the object 40, the object 40 is determined to have been selected.

As is understood from FIGS. 4 to 6, in the first and second embodiments, it is possible to point to any pointer 50 using the two parameters, that is, the vertical distance R from the pointer to the touchscreen surface and the direction of the pointer 50. Where the pointer 50 according to the second embodiment is used, the length of the line segment OS is fixed, and the vertical distance R is represented by the angle $\alpha$. Accordingly, it is possible to point to an object 40 on the touchscreen 21 using only the angles $\theta$ and $\alpha$.

Figure 8:
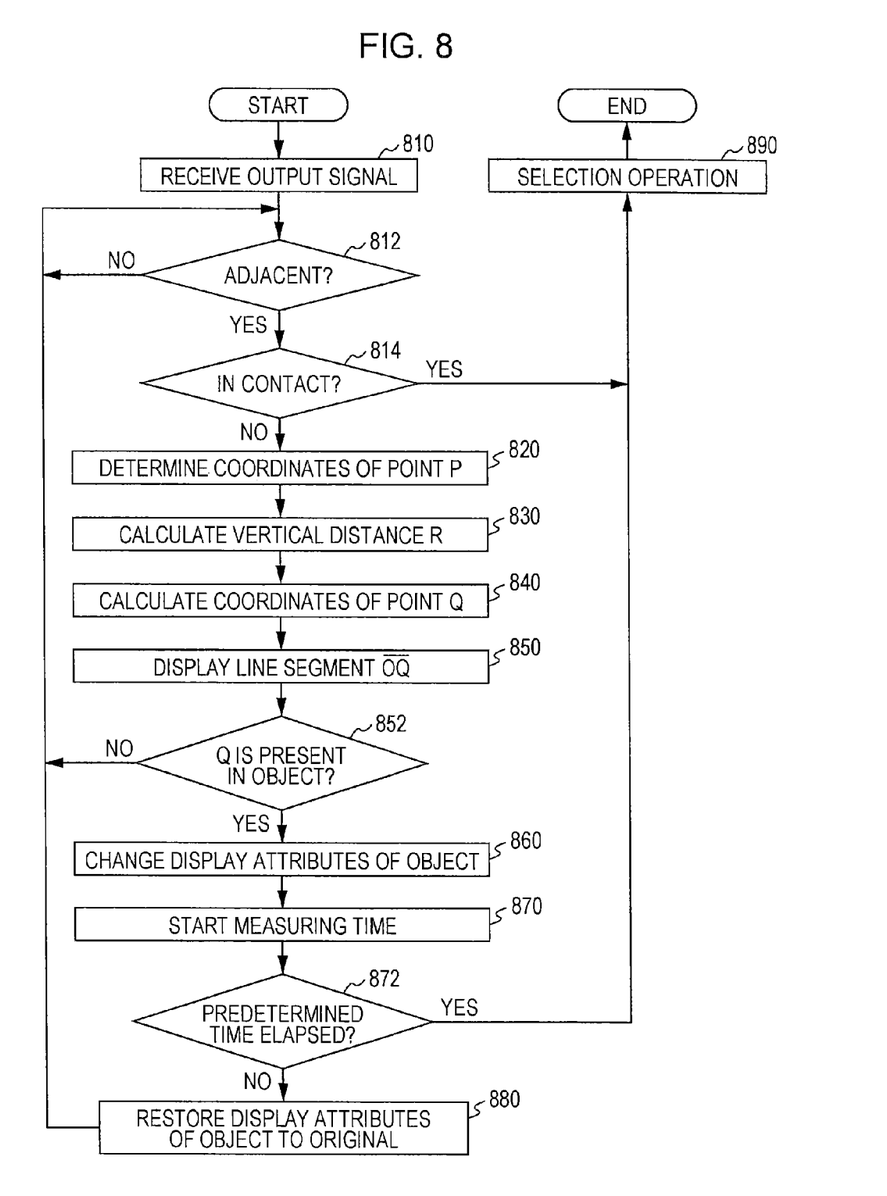
FIG. 8 is a flowchart of a method for pointing to an object displayed on a touchscreen in accordance with an embodiment of the present invention.

FIG. 8 is a flowchart showing specific process steps performed by the CPU 11 of the information processing apparatus 1 according to the first embodiment. Referring to FIG. 8, in conjunction with FIGS. 1-7, in step 810, an output signal is received. In step 812, whether the thumb is adjacent to the touchscreen 21 is determined. If the thumb is adjacent, whether the thumb is in contact with the touchscreen 21 is determined in step 814. If the thumb is not adjacent, the process returns to step 812.

If the thumb is determined in step 814 to be in contact, the process proceeds to step 890, and a selection process is performed using the contact coordinates (x,y) as a selection position. If an object is present at the selection position in step 890, a function associated with the object is performed.

If the thumb is determined in step 814 not to be in contact, the position of the point P is determined in step 820. The point P refers to an intersection point of a normal drawn down from the tip of the thumb to the touchscreen surface with the touchscreen 21. In step 830, the distance between the thumb and the touchscreen is calculated.

In step 840, the line segment OQ which is proportional to R is considered. The coordinates of the point Q are calculated using $Q(Qx,Qy) = P(a \cdot R \cdot Px, a \cdot R \cdot Py)$.

The coordinates of the point Q may be calculated in the following way: the angle $\theta$ formed by the line segment OP and the x axis is calculated from the coordinates (Px, Py) of the point P; the line segment OQ that has the same angle as the angle $\theta$ and that has a length proportional to R is considered; and the coordinates of the point Q of the line segment OQ are calculated. Preferably, the line segment OQ is graphically displayed in step 850. Instead of the line segment OQ, only the point Q may be displayed.

The process proceeds to step 852. It is determined whether the end of the line segment OQ, the point Q, is in contact with or falls within any object. If the determination is NO, the process returns to step 812. If the determination in step 852 is YES, the process proceeds to step 860. Display attributes of the object contacted are changed, and the user is notified that the object 40 has been pointed. At this time, a sound may be made or the apparatus may be vibrated.

The process proceeds to step 870. The timer 103 starts measuring the time. A determination is made in step 872 as to whether the point Q has stayed in the object 40 for a predetermined time. If the point Q has stayed in the object 40 for a predetermined time, then the process proceeds to step 890. A process of selecting the object 40 is performed using the coordinates (Qx,Qy) of the point Q as a selection position, and a function assigned to the object 40 is performed. Preferably, display attributes of the object 40 are further changed at the point in time when the object 40 is selected so that the user is notified that the function of the selected object will be performed.

If the point Q leaves the object 40 before the predetermined time elapses, the display attributes of the object are restored to the original in step 880. Subsequently, the process returns to step 812.

Other selection operations include turn-on of a physical switch provided on a side surface of the touchscreen 21. Further, a signal from a vibration sensor, a gyro, or the like included in the information processing apparatus separately may be used as a trigger for a selection operation. Of course, an object 40 displayed on the touchscreen 21 separately and assigned a selection function may be touched using a finger.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for pointing to an object displayed on a touchscreen using an information processing apparatus, the information processing apparatus being connected to the touchscreen so that the touchscreen and the information processing apparatus can communicate data to each other, the touchscreen having a display function, the method comprising:

calculating coordinates of a point P, the point P being a position on a surface of the touchscreen corresponding to a position of a fingertip of a user located above the surface of the touchscreen;

calculating a vertical distance R between the surface of the touchscreen and the fingertip;

calculating coordinates of a point Q of a line segment OQ, the line segment OQ extending in the same direction as a line segment OP connecting an origin O on the surface of the touchscreen and the point P, the line segment OQ having a length that is proportional to the vertical distance R; and in response to an object being displayed at the coordinates of the point Q, determining, by a processor, that the object has been pointed to.

2. The method as recited in claim 1, wherein the calculating of the coordinates of the point Q comprises calculating the coordinates of the point Q of the line segment OQ having a length that is inversely proportional to the vertical distance R.

3. The method as recited in claim 1, wherein the calculating of the coordinates of the point Q comprises calculating the coordinates of the point Q of the line segment OQ having a length that is proportional or inversely proportional to a square of the vertical distance R.

4. The method as recited in claim 1, wherein the determination that the object has been pointed to comprises changing display attributes of the pointed object.

5. The method as recited in claim 4 further comprising:
in response to the point Q having left a display area of the object before a predetermined time elapses, cancelling the pointing of the object and restoring the display attributes to the original.

6. The method as recited in claim 1, wherein the calculating of the coordinates of the point Q comprises displaying the line segment OQ on the touchscreen.

7. The method as recited in claim 1, wherein the calculating of the coordinates of the point Q comprises displaying the point Q on the touchscreen.

8. The method as recited in claim 1 further comprising:
in response to the point Q having stayed in a display area of the object for a predetermined time, determining that the object has been selected.

9. The method as recited in claim 8 further comprising:
in response to the object having been selected, further changing display attributes of the object.

10. The method as recited in claim 8 further comprising:
in response to the object having been selected, performing a function that is previously assigned to the object.

11. A non-transitory computer readable storage medium having a computer program product stored thereon for pointing to an object displayed on a touchscreen using an information processing apparatus, the information processing apparatus being connected to the touchscreen so that the touchscreen and the information processing apparatus can communicate data to each other, the touchscreen having a display function, the computer program product comprising the programming instructions for:
calculating coordinates of a point P, the point P being a position on a surface of the touchscreen corresponding to a position of a fingertip of a user located above the surface of the touchscreen;
calculating a vertical distance R between the surface of the touchscreen and the fingertip; calculating coordinates of a point Q of a line segment OQ, the line segment OQ extending in the same direction as a line segment OP connecting an origin O on the surface of the touchscreen and the point P, the line segment OQ having a length that is proportional to the vertical distance R; and in response to an object being displayed at the coordinates of the point Q, determining that the object has been pointed to.

12. The non-transitory computer readable storage medium as recited in claim 11, wherein the programming instructions for calculating the coordinates of the point Q comprises the programming instructions for calculating the coordinates of the point Q of the line segment OQ having a length that is inversely proportional to the vertical distance R.

13. The non-transitory computer readable storage medium as recited in claim 11, wherein the programming instructions for calculating the coordinates of the point Q comprises the programming instructions for calculating the coordinates of the point Q of the line segment OQ having a length that is proportional or inversely proportional to a square of the vertical distance R.

14. The non-transitory computer readable storage medium as recited in claim 11, wherein the programming instructions for determining that the object has been pointed to comprises the programming instructions for changing display attributes of the pointed object.

15. The non-transitory computer readable storage medium as recited in claim 14 further comprising the programming instructions for:
in response to the point Q having left a display area of the object before a predetermined time elapses, cancelling the pointing of the object and restoring the display attributes to the original.

16. The non-transitory computer readable storage medium as recited in claim 11, wherein the programming instructions for calculating the coordinates of the point Q comprises the programming instructions for displaying the line segment OQ on the touchscreen.

17. The non-transitory computer readable storage medium as recited in claim 11, wherein the programming instructions for calculating the coordinates of the point Q comprises the programming instructions for displaying the point Q on the touchscreen.

18. The non-transitory computer readable storage medium as recited in claim 11 further comprising the programming instructions for:
in response to the point Q having stayed in a display area of the object for a predetermined time, determining that the object has been selected.

19. The non-transitory computer readable storage medium as recited in claim 18 further comprising the programming instructions for:
in response to the object having been selected, further changing display attributes of the object.

20. The non-transitory computer readable storage medium as recited in claim 18 further comprising the programming instructions for:
in response to the object having been selected, performing a function that is previously assigned to the object.

21. A system, comprising: a memory unit for storing a computer program for pointing to an object displayed on a touchscreen of the system, the touchscreen having a display function; and a processor coupled to the memory unit, wherein the processor, responsive to the computer program, comprises:
circuitry for calculating coordinates of a point P, the point P being a position on a surface of the touchscreen corresponding to a position of a fingertip of a user located above the surface of the touchscreen;

circuitry for calculating a vertical distance R between the surface of the touchscreen and the fingertip;

circuitry for calculating coordinates of a point Q of a line segment OQ, the line segment OQ extending in the same direction as a line segment OP connecting an origin O on the surface of the touchscreen and the point P, the line segment OQ having a length that is proportional to the vertical distance R; and in response to an object being displayed at the coordinates of the point Q, circuitry for determining that the object has been pointed to.

22. The system as recited in claim 21, wherein the circuitry for calculating the coordinates of the point Q comprises circuitry for calculating the coordinates of the point Q of the line segment OQ having a length that is inversely proportional to the vertical distance R.

23. The system as recited in claim 21, wherein the circuitry for calculating the coordinates of the point Q comprises circuitry for calculating the coordinates of the point Q of the line segment OQ having a length that is proportional or inversely proportional to a square of the vertical distance R.

24. The system as recited in claim 21, wherein the circuitry for determining that the object has been pointed to comprises circuitry for changing display attributes of the pointed object.

25. The system as recited in claim 24, wherein the processor further comprises:

in response to the point Q having left a display area of the object before a predetermined time elapses, circuitry for cancelling the pointing of the object and restoring the display attributes to the original.

\* \* \* \* \*